US012542356B2

(12) United States Patent
Levinger

(10) Patent No.: US 12,542,356 B2
(45) Date of Patent: Feb. 3, 2026

(54) LOW RADIATION HIGH SYMMETRY INDUCTOR

(71) Applicant: Intel Corporation, Santa Clara, CA (US)

(72) Inventor: Run Levinger, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 804 days.

(21) Appl. No.: 17/704,050

(22) Filed: Mar. 25, 2022

(65) Prior Publication Data

US 2023/0307836 A1    Sep. 28, 2023

(51) Int. Cl.
*H01Q 7/00* (2006.01)
*H04B 5/26* (2024.01)

(52) U.S. Cl.
CPC ............... *H01Q 7/00* (2013.01); *H04B 5/26* (2024.01)

(58) Field of Classification Search
CPC .................................... H01Q 7/00; H04B 5/26
See application file for complete search history.

(56) References Cited

U.S. PATENT DOCUMENTS

| | | | | |
|---|---|---|---|---|
| 4,968,959 A * | 11/1990 | Levy | ...................... | H03B 19/14 333/218 |
| 2003/0094950 A1 * | 5/2003 | Burl | .................. | G01R 33/3621 324/318 |
| 2015/0065068 A1 * | 3/2015 | Mattsson | ............ | H01F 27/2804 336/200 |
| 2018/0061547 A1 * | 3/2018 | Hanson | .................. | H01F 27/292 |
| 2020/0266792 A1 * | 8/2020 | Bagga | ...................... | H01F 19/04 |
| 2020/0295122 A1 * | 9/2020 | Yun | .......................... | H01L 24/48 |
| 2021/0134514 A1 * | 5/2021 | Sheng | ...................... | H01F 17/04 |
| 2024/0161958 A1 * | 5/2024 | Dai | .......................... | H01F 17/04 |
| 2025/0079063 A1 * | 3/2025 | Elasser | .................. | H01F 27/306 |

FOREIGN PATENT DOCUMENTS

WO    2021236143 A1    11/2021

* cited by examiner

*Primary Examiner* — Thien M Le
(74) *Attorney, Agent, or Firm* — Viering, Jentschura & Partner mbB

(57) ABSTRACT

A circuitry including a first S-shaped winding and a second S-shaped winding configured to form a figure-8 inductive structure; a first terminal coupled to a first end of the first S-shaped winding and a second terminal coupled to a first end of the second S-shaped winding, wherein the first terminal is configured to receive a first positive signal and the second terminal is configured to receive a first negative signal; a third terminal coupled to a second end of the first S-shaped winding and a fourth terminal coupled to a second end of the second S-shaped winding, wherein the third terminal is configured to receive a second negative signal and the fourth terminal is configured to receive a second positive signal; wherein a magnetic flux is concentrated at an intersection of the first S-shaped winding and the second S-shaped winding when a first current flows through them.

19 Claims, 9 Drawing Sheets

LOW RADIATION HIGH SYMMETRY INDUCTOR

TECHNICAL FIELD

This disclosure may generally relate to the field of semiconductor chip manufacturing including integrated resonating inductor and capacitor (LC) filters.

BACKGROUND

Communication and sensing systems often must adhere to strict emissions constraints. For example, IEEE standards may dictate emission constraints and require that communication systems operating according to the IEEE standard meet said emission constraints. Communication and sensing systems may require high performance from their components, for example low phase noise. Obtaining low phase noise from components, such as oscillators, at high frequencies may present a challenge. Low phase noise oscillators may require high quality structures that tend to radiate and violate emissions regulations.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various aspects of the disclosure are described with reference to the following drawings, in which.

DETAILED DESCRIPTION

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Due to semiconductor design limitations, it may be difficult to design circuitry which combines a low inductance value, a high Quality (Q) factor, and low radiation emission across wideband scenarios. For example, a low inductance value less than 100 picoHenry and a Q factor greater than 20. Single-port figure-8 inductors generate low radiation emission, but cannot obtain a low inductance value or a high Q value. Additionally, multi-port circular inductors, having 2 or more ports, generate a low inductance value and a high Q value. However, multi-port circular inductors suffer from high radiation emissions. Given these limitations, the devices described may utilize a modified multi-port figure-8 inductor to achieve low inductance while maintaining a high Q factor across wideband scenarios. The modified multi-port figure-8 inductor may also reduce radiation emission allowing for a smaller circuitry footprint.

Obtaining very low phase noise in silicon while maintaining strict reliability constraints has become a bottleneck in communication and sensing technologies. For example, communication and sensing systems advancements may be throttled by advanced CMOS nodes limitations.

Phase noise may be proportional to the inductor value and the frequency of a signal. If the frequency is static, the inductor value may be modified to reduce phase noise. For example, if implementing a CMOS with an oscillator at mmWave frequencies, modifications to the inductor value can reduce phase noise as long as the inductor Q factor does not degrade when reducing the inductor value. System constants for pulling or harmonic content may require specific frequencies. Assuming the circuitry already achieves the best efficiency from the circuitry topology, achieving a low inductor value may achieve further efficiencies. However, lowering the inductor value below a certain value may degrade the Q factor and thus limit the minimum obtainable phase noise. In addition, various aspects of this disclosure meet regulatory requirements and reduce coupling to other blocks, and may provide an inductor to achieve low radiation emissions. Existing low radiation inductors, such as the quadrupole ("8 shape") inductor or the "clover leaf inductor," suffer from lower Q as compared to conventional inductors at low inductance values.

Figure 8:
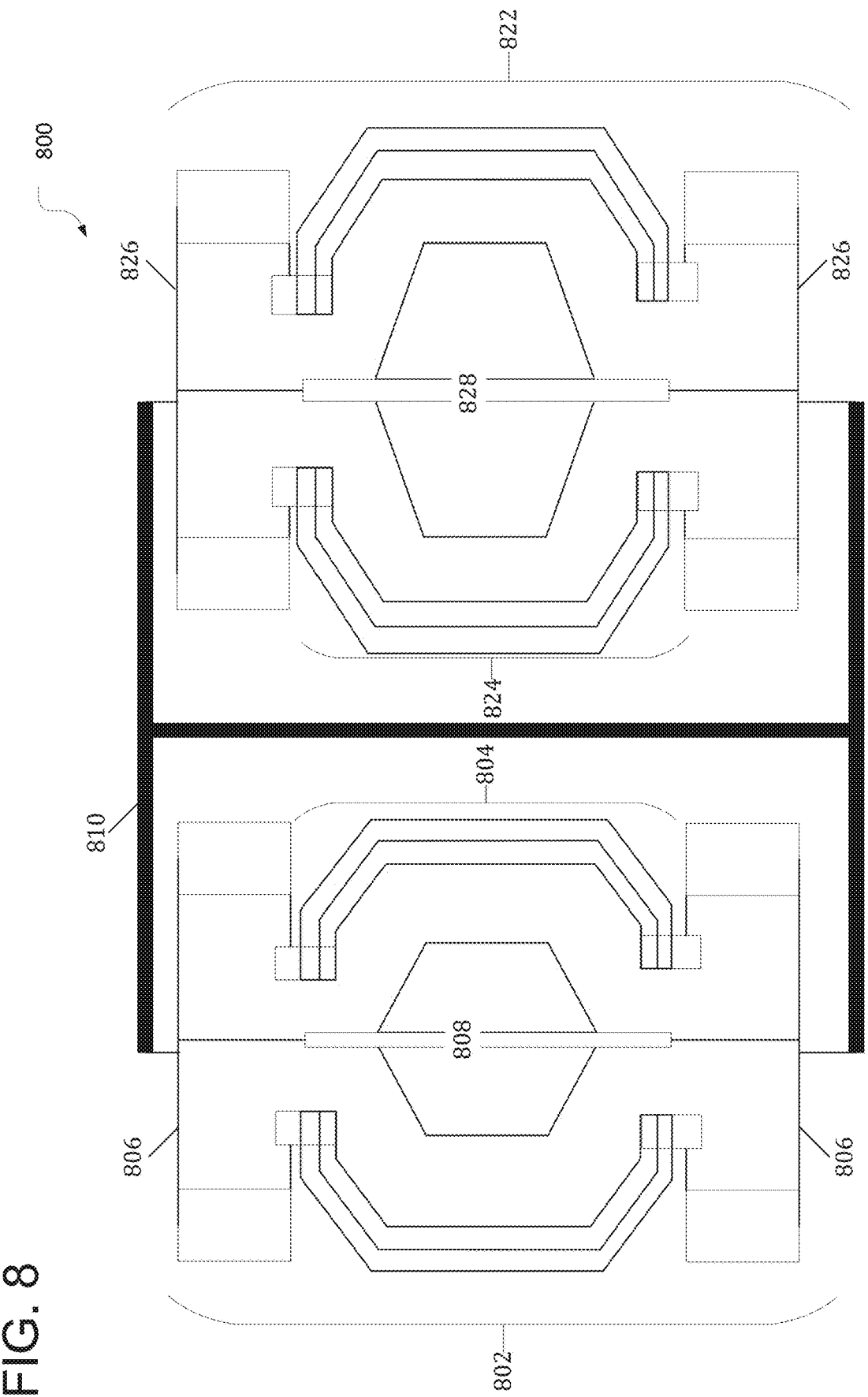
FIG. 8 illustrates a block configuration of two multi-port circular inductors.

A multi-port figure-8 inductor may accomplish a low inductance value and a high Quality (Q) factor in combination with low radiation emission across wideband scenarios. The multi-port figure-8 inductor structure may cancel out the near field magnetic flux in the periphery of the structure. Additionally, the multi-port figure-8 inductor structure may maintain a high Q value with a low inductance value. The multi-port figure-8 inductor structure includes two S-shaped windings as described below. The multi-port figure-8 inductor structure is able to achieve the low radiation of a single-port figure-8 inductor and the low inductance value and high Q value of a multi-port circular inductor.

Figure 1:
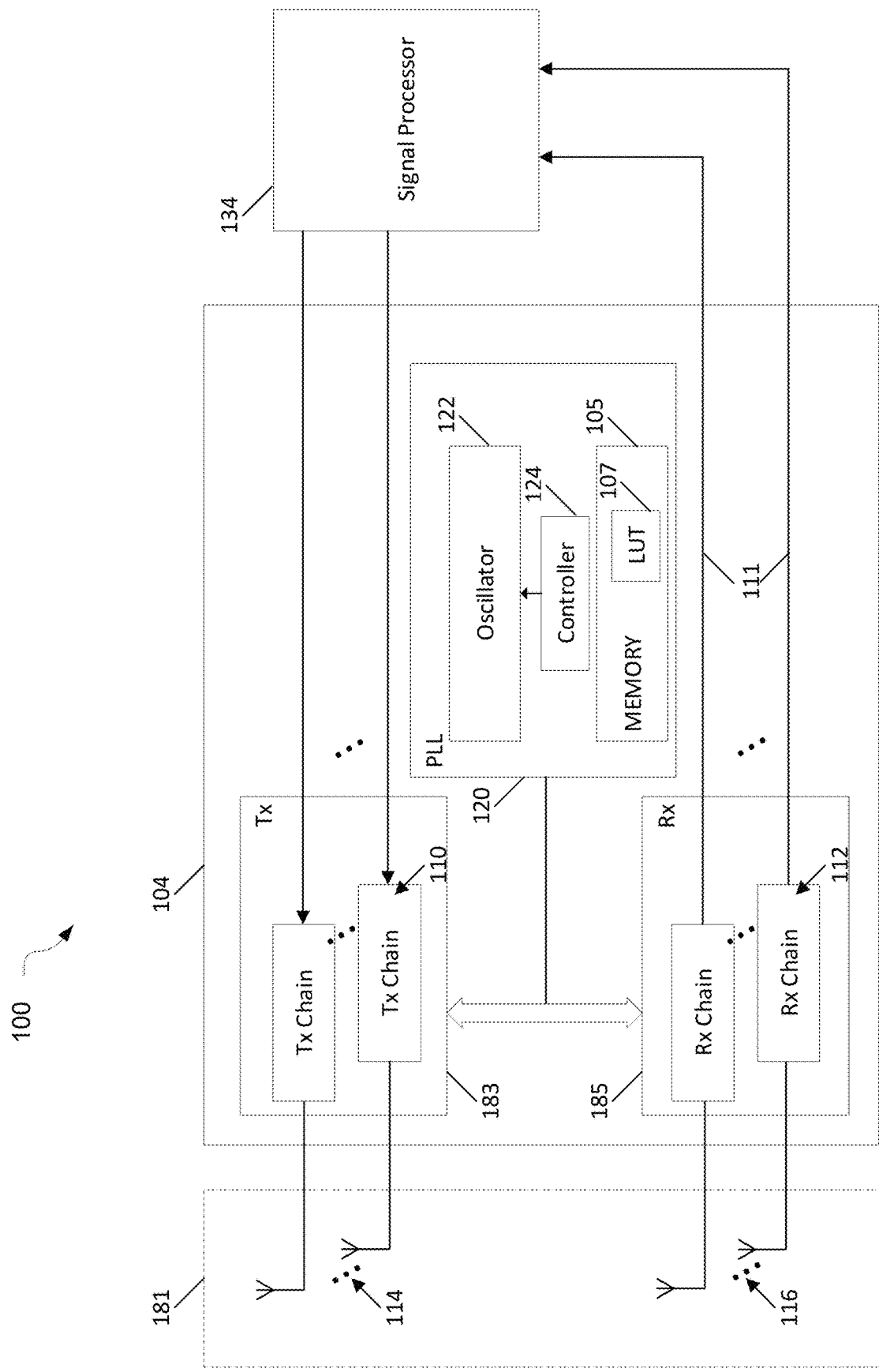
FIG. 1 illustrates an exemplary block diagram of a communication or sensing device.

FIG. 1 illustrates a block diagram of a device 104 configured to process a RF signal. Device 104 may be implemented as a part of a UE, a MIMO radar device, or any other device configured to process a RF signal. Device 104 may include antenna array 181. Antenna array 181 may include one or more Tx antennas 114 configured to transmit one or more Tx RF signals, and one or more Rx antennas 116 configured to receive one or more Rx signals.

Antenna array 181, antennas 114, and/or antennas 116 may include or may be part of any type of antennas suitable for transmitting and/or receiving RF signals, for example, a Multiple-Input-Multiple-Output (MIMO) antenna array. Antenna array 181, antennas 114, and/or antennas 116, may be implemented as part of any suitable configuration, structure, and/or arrangement of one or more antenna elements, components, units, assemblies, and/or arrays. For example, MIMO antenna array 181, antennas 114, and/or antennas 116, may be implemented as part of a phased array antenna, a multiple element antenna, a set of switched beam antennas, and/or the like. In some aspects, antenna array 181, antennas 114, and/or antennas 116, may be implemented to support transmit and receive functionalities using separate transmit and receive antenna elements. In some aspects, antenna array 181, antennas 114, and/or antennas 116, may be implemented to support transmit and receive functionalities using common and/or integrated transmit/receive elements.

Antenna array 181 may be a rectangular antenna array, and/or curved array, e.g., shaped to fit a vehicle design. In other aspects, any other form, shape and/or arrangement of antenna array 181 may be implemented.

Device 104 may include one or more radios configured to generate and transmit the Tx RF signals via Tx antennas 114; and/or to process the Rx RF signals received via Rx antennas 116, e.g., as described below.

Device 104 may include at least one transmitter (Tx) 183 including circuitry and/or logic configured to generate and/or transmit the Tx RF signals via Tx antennas 114. Device 104 may include at least one receiver (Rx) 185 including circuitry and/or logic to receive and/or process the Rx RF signals received via Rx antennas 116, for example, based on the Tx RF signals.

Transmitter 183, and/or receiver 185 may include circuitry; logic; RF elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

Transmitter 183 may include a plurality of Tx chains 110 configured to generate and transmit the Tx RF signals via Tx antennas 114, e.g., respectively; and/or receiver 185 may include a plurality of Rx chains 112 configured to receive and process the Rx RF signals received via the Rx antennas 116, e.g., respectively.

Signal processor 134 may be configured to generate signal information 113, for example, based on the RF signals communicated by antenna array 181. Signal processor 134 may be configured to generate signal information 113 based on Rx RF data 111 received from the plurality of Rx chains 112. For example, Rx RF data 111 may be based on the Rx RF signals received via the Rx antennas 116.

In one example, signal processor 134 may be configured to generate radar information including one or more of range information, Doppler information, and/or Angle of Arrival (AoA) information based Rx radar signals. Additionally, signal information 113 may include Point Cloud 1 (PC1) information, for example, including raw point cloud estimations, e.g., Range, Radial Velocity, Azimuth and/or Elevation. Furthermore, signal information 113 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In another example, signal processor 134 may be configured to process the signals communicated via antenna array 181 as signals of a virtual MIMO array formed by a convolution of the plurality of Rx antennas 116 and the plurality of Tx antennas 114.

Device 104 may include a Phased Lock Loop (PLL) 120. PLL 120 may be configured to provide a frequency signal to one or more RF chains, for example, Tx chains 110 and/or Rx chains 112, e.g., as described below. PLL 120 may include a Digital PLL (DPLL). Frequency synthesizers based on DPLL may provide an alternative to analog PLLs. For example, one difference between analog PLLs and DPLLs may be in the retrieval and processing of phase information into frequency commands, which may be applied to a local oscillator (LO).

In one example, a DPLL, e.g., PLL 120, may include a Time to Digital Converter (TDC) configured to measure a relative phase between the LO and reference clock (REF) signals; and digital logic to compute a required frequency setting (shift), e.g., to compensate for the relative phase.

Device 104 may include a Local Oscillator (LO) 122. In some demonstrative aspects, LO 122 may be implemented as part of PLL 120. In other aspects, LO 122 may be implemented as part of any other additional or alterative element of device 104. LO 122 may include a Digitally Controlled Oscillator (DCO).

LO 122 may be required to cover a relatively wide bandwidth. In other to support such a wide bandwidth, the controlling of the LO 122 to adjust to the required frequency shift may be broken-down into several segments, for example, along segments of predefined frequency shifts. The frequency shift may be performed according to a Coarse Tune (CT) setting and a Fine Tune (FT) setting. For example, the CT setting may be applied to control large frequency shifts of LO 122, e.g., shifting between frequency bands. In another example, the CT setting may remain constant, for example, during a phase-lock of PLL 120.

The FT setting may be applied to control smaller frequency shifts of the LO 122, e.g., compared to the frequency shifts of the CT setting. In one example, the FT setting may be applied to control frequency shifts of the LO 122, which may be required to maintain a phase-lock over time. In another example, PLL 120 may be configured to operate in a plurality of operational stages, for example, including an acquisition stage and a tracking stage.

PLL 120 may apply the CT setting and the FT setting, for example, during the acquisition stage and/or during the tracking stage.

PLL 120 may apply the CT setting during the acquisition stage, for example, by selecting a best fitting band and a region in which a required frequency may be found, for example, using auxiliary Frequency Locked Loop (FLL) circuitry, which may be controlled by an Automatic Band Selector (ABS).

PLL 120 may be released to lock to a phase of a reference signal, for example, by applying the FT setting, for example, after selecting the best fitting band and the region.

PLL 120 may continuously measure a phase during the tracking stage. For example, the phase may be continuously measured and juxtaposed to the required value. For example, a discrepancy, e.g., every discrepancy, may result in a command to change the FT setting.

Implementations and/or use cases, may require re-locking to the required frequency during the tracking stage. For example, these scenarios may result in a change in the CT setting, which may result in reactivating the FLL circuitry, e.g., as described below.

In one example, a power supply drift and/or a temperature drift may cause the FT setting to approach the edge of a sub-band to which PLL 120 is locked. For example, this proximity may cause PLL 120 to lose the lock to the required frequency, for example, if the drift is not treated, e.g., by applying a suitable CT setting.

At least one of the Rx chains of the plurality of Rx chains 112 may include a multi-core Low Noise Amplifier (LNA).

Device 104 may include a memory 105 to store mapping information, for example, in the form of a Lookup Table (LUT) 107 to map a plurality of LO frequencies to a respective plurality of LO settings of LO 122, e.g., at a first environment condition. Mapping information may be stored in memory 105 in any other form and/or data structure.

Memory 105 may be implemented as part of controller 124 and/or as part of PLL 120. In other aspects, memory 105 may be implemented as part of any other element of device 104.

Controller 124 may be configured to control settings of the LO 122 to a required LO frequency, for example, at a second environment condition.

Figure 2:
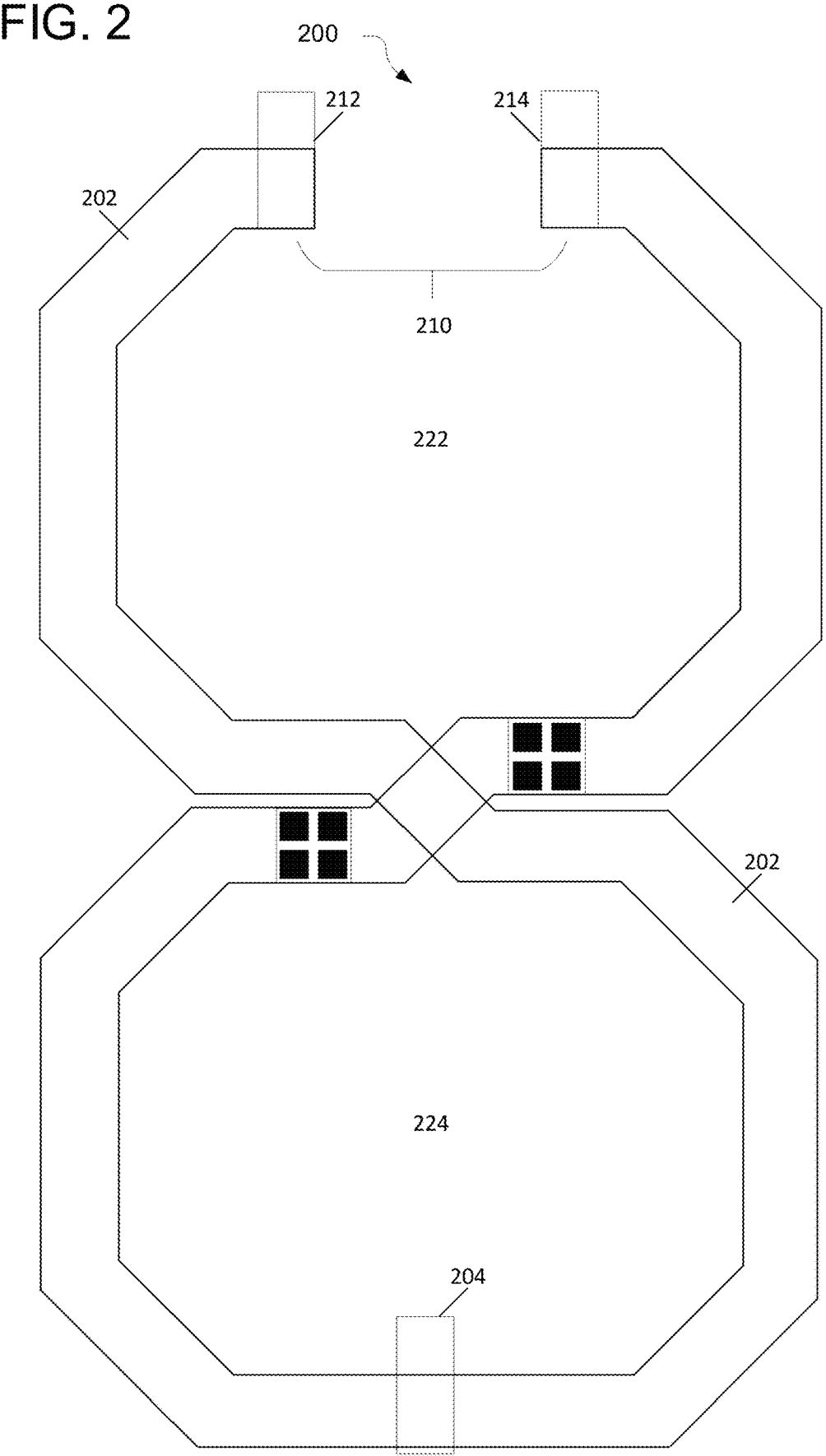
FIG. 2 illustrates an exemplary single-port figure-8 inductor.

FIG. 2 illustrates a single-port figure-8 inductor structure 200. Inductor structure 200 may include one turn in each branch of a single winding 202 as shown in FIG. 2, creating an upper loop 222 and a lower loop 224. Inductor structure 200 may include a first winding 202. First winding 202 may have a width of 14 µm. Upper loop 222 may include port 210. Port 210 may include first terminal 212 and second terminal 214. Terminals 212 and 214 may be configured to receive a signal. For example, terminal 212 may be configured to receive a positive signal and terminal 214 may be configured to receive a negative signal. The negative signal may be 180 degrees out of phase relative to the positive signal. Lower loop 224 of inductor structure 200 may also include terminal 204. The position of terminal 204 may be at a point of symmetry of structure 200. Terminal 204 may be configured to receive a bias path.

Figure 3:
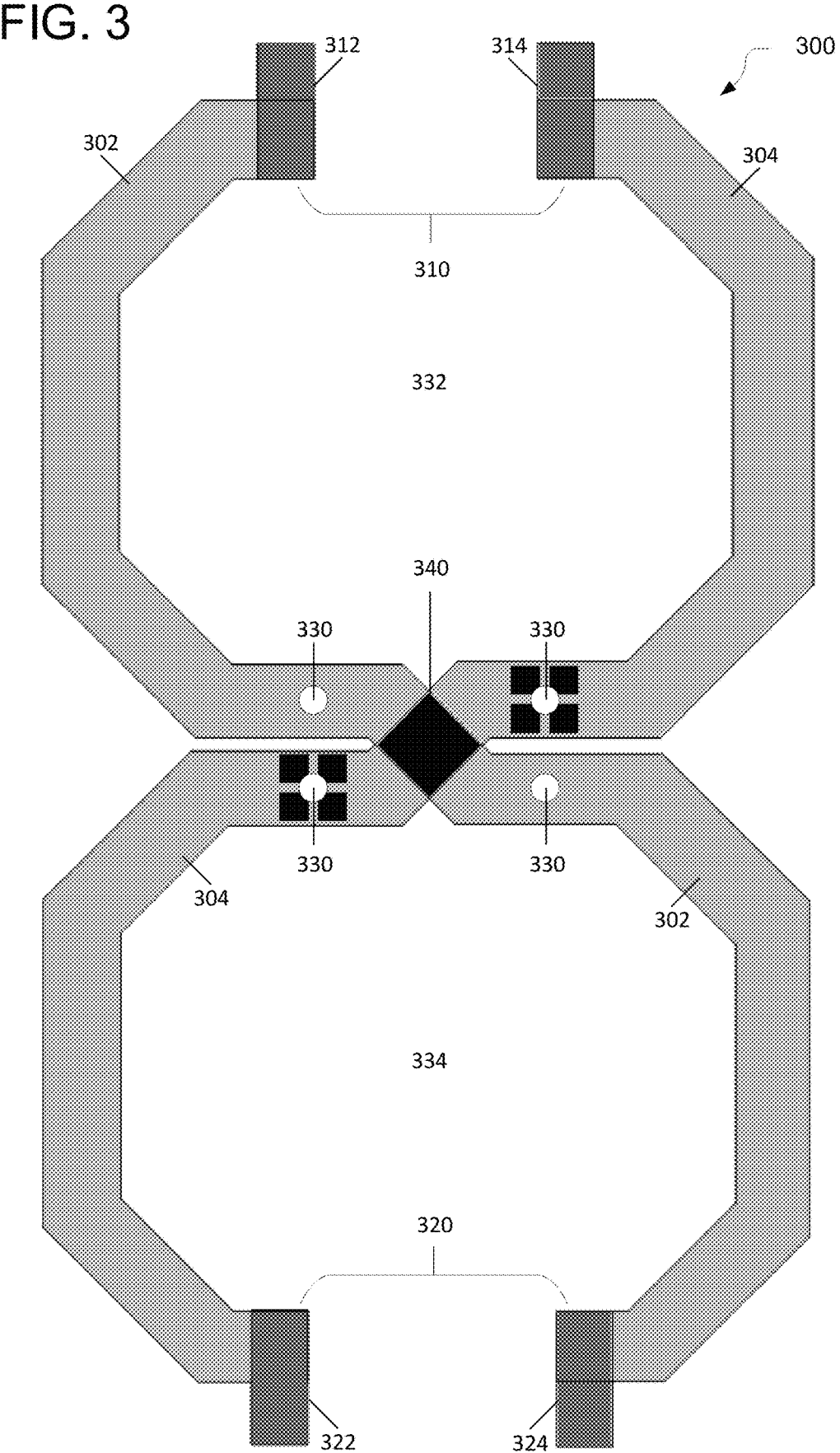
FIG. 3 illustrates an exemplary multi-port figure-8 inductor.

FIG. 3 illustrates a two-port figure-8 inductor structure 300. Inductor structure 300 may be included as part of PLL 120 of FIG. 1. Inductor structure 300 may include one an upper loop 332 and a lower loop 334. The inductive part of inductive structure 300 may include a first S-shaped winding 302 and a second S-shaped winding 304. Second winding 304 may be the mirror image of first winding 302. First winding 302 and second winding 304 may intersect at center point 340. First winding 302 may form part of upper loop 332 of inductor structure 300 and part of lower loop 334 of inductor structure 300. Second winding 304 may form part of upper loop 332 and part of lower loop 334 of inductor structure 300.

Upper loop 332 may include first port 310. First port 310 may include first terminal 312 and second terminal 314. Lower loop 334 may include second port 320. Second port 320 may include third terminal 322 and a fourth terminal 324. First terminal 312 may be configured to receive a first positive signal. Second terminal 314 may be configured to receive a first negative signal. Third terminal 322 may be configured to receive a second positive signal, wherein the first positive signal of first terminal 312 and the second positive signal of third terminal 322 are in the same phase relative to each other. Fourth terminal 324 may be configured to receive a second negative signal, wherein the first negative signal of first terminal 314 and the second negative signal of fourth terminal 324 are in the same phase, or 0 degrees out of phase, relative to each other. Furthermore, the first positive signal of first terminal 312 and the first negative signal of second terminal 314 are 180 degrees out of phase relative to each other. Additionally, the second positive signal of third terminal 322 and the second negative signal of fourth terminal 324 are 180 degrees out of phase relative to each other, so that the negative and positive signals as a whole are 180 degrees out of phase.

Inductor structure 300 is driven by receiving two positive signals and two negative signals at both ports as previously described. Terminals 312, 314, 322, and 324 may be configured to receive signals from a plurality of amplifiers or oscillators. The amplifiers or oscillators may generate RF signals as input for the terminals 312, 314, 322, and 324 of inductor structure 300. The amplifiers or oscillators may be inductively coupled to terminals 312, 314, 322, and 324 to drive inductor structure 300. The oscillators may be part of two different oscillator cores. One core for each port 310 and 320 of inductor structure 300.

Inductor structure 300 may include bias points 330 that serve as a virtual point of symmetry, for example four bias points 330 as shown in FIG. 3. A bias may be introduced at bias points 330.

Coupling several oscillators within a conventional inductor structure may degrade overall performance without degrading the Q and inductance values. Coupling oscillators or resonators within the loops of inductor structure 300 may maintain an overall inductor footprint. Inductor structure 300 may achieve the advantages of maintaining high Q values and low inductance values without introducing other performance issues. For example, standards may include constraints such as a Q value of 26 or greater and an inductance value of 71 pH or across a range of frequencies. Inductor 300 may have a length from port 310 to port 320 of 186 µm and a width of 102 µm to generate 30 GHz frequency waves. Inductor 300 may use the requirements as thresholds and be configured to achieve the meet or exceed the requirements. Additionally, inductor structure 300 may obtain reduced phase noise caused by magnetic flux radiation.

Inductor 300 may be configured to specifically meet standard requirements. For example, the length from port to port of inductor structure 300 may be 250 µm and the width at the widest part the upper and lower loops may be 210 µm to achieve requirements. Parameters that may be modified to achieve requirements include: inductor length, inductor width, terminal length, coil width, coil spacing, symmetry, port width, and any other parameter that may affect the operation of inductor 300.

Low radiation inductors like quadrupole ("8 shape") or "clover leaf inductor shapes may prevent the magnetic flux or radiation to develop into particular directions by introducing more nulls in the radiation pattern for both near and far field regions. However, these methods of implementing an inductor has a moderate Q value. As the inductor size decreases beyond a certain value, the Q value drops even further, reducing oscillator efficiency.

Circular Oscillator Inductors may implement series coupling of two cores of oscillators, such as CMOS, linear transconductance (LiT), or any other suitable oscillator topology, to lower the phase noise. However, series coupling requires a large area metal structure for the effective inductor. This may create an environment where near field radiation can spread within a wider area. Therefore, all metal boundary conditions in the vicinity of the inductor must be accounted for. It was observed that this structure implementation may suffer from asymmetries due to variable boundary conditions.

The inductor structure 300 is configured to cancel out the near magnetic field in the periphery of the structure, while maintaining a high Q value and low inductance value. Inductor structure 300, has the advantage of low radiation of the quadrupole ("8 shape") inductor, and the high Q with a low inductance value found in the operation of some circular inductors.

Using the topology of inductor structure 300, it is possible to benefit from circular linear transconductance (LiT) topology advantages while reducing concern of violating regulatory constraints and interfering with other blocks. As another benefit, the reduced immunity to the structure surroundings improves its symmetry and reduces flicker noise up conversion, which can highly improve correlation to simulation.

FIG. 3 shows first winding 302 crossing over second winding 304 at their intersection 340. Windings 302 and 304 may be composed of different metals at intersection 340. It should be noted that other configurations are possible. For example, second winding 304 could cross over first winding 302 at their intersection. Additionally, the turns in loops 332 and 334 may be a 45 degree angle as shown in FIG. 3. It should be noted that other configurations are possible. For example, the turns in may be a 90 degree angle.

Inductor structure 300 leverages the strength of the circular inductor which obtains a low effective inductance with high Q value needed for low phase noise oscillators at high frequencies. Additionally, inductor structure 300 achieves low radiation properties of the legacy 2 port quadrupole inductors. This enables the design of inductor structure 300 for low phase oscillators that have low radiation and are more robust to metallic boundary conditions and external interference from other circuits.

By opening the lower loop of and creating a second port and terminals, inductor structure 300 is able to achieve significantly lower inductance over a wider Q factor as compared to inductor structure 200. As described in FIG. 3, the terminals may be configured to receive two positive signals and two negative signals, where the positive signals are in the same phase as each other and the two negative signals are in the same phase as each other. With this configuration, inductor structure 300 is able to achieve a significantly lower inductance with a better and much wider Q factor while maintaining the magnetic flux pattern as compared to other inductor structures.

Figure 4:
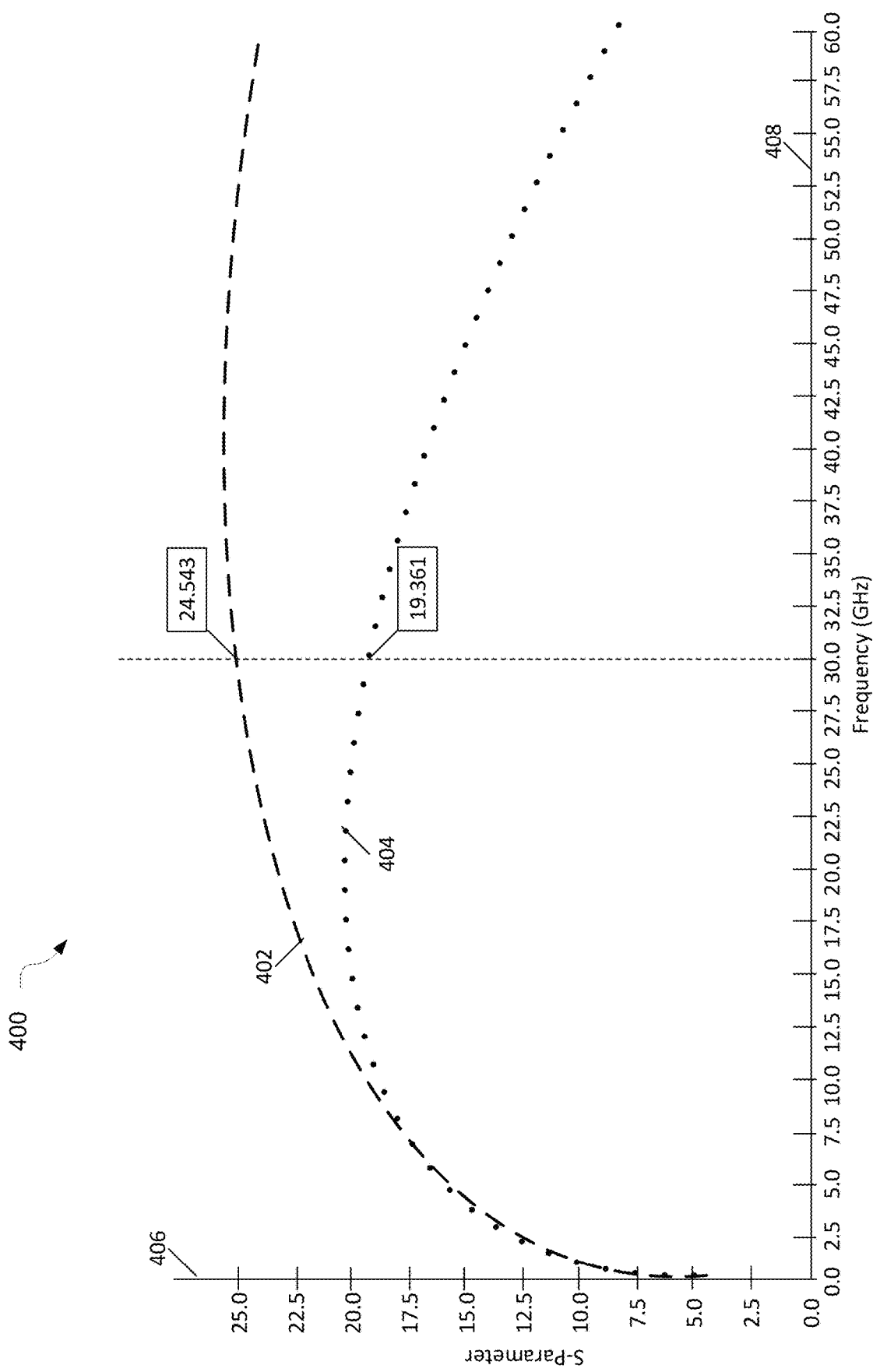
FIG. 4 illustrates a comparison of quality (Q) factor values between a single-port figure-8 inductor and a multi-port figure-8 inductor of the same size.

FIG. 4 illustrates a comparison of Q factor between a single-port figure-8 inductor structure, such as inductor structure 200, and a multi-port figure-8 inductor structure, such as inductor structure 300. FIG. 4 shows chart 400 which compares the scattering parameter (S-Parameter) for the single-port figure-8 inductor structure and the multi-port figure-8 inductor structure. Chart 400 includes the S-Parameter along Y-axis 406 and the frequency, in GHz, along X-axis 408. Line 402 represents the S-Parameter for the multi-port figure-8 inductor structure across different frequencies. Line 404 represents the S-Parameter for the single-port figure-8 inductor structure across different frequencies. As shown in chart 400, line 402 shows an improved S-Parameter, or Q value, over a wideband of frequencies as compared to line 404. For example, at 30 GHz, the multi-port figure-8 inductor structure achieves a Q value of 24.543, while the single-port figure-8 inductor structure achieves a Q value of 19.361.

Figure 5:
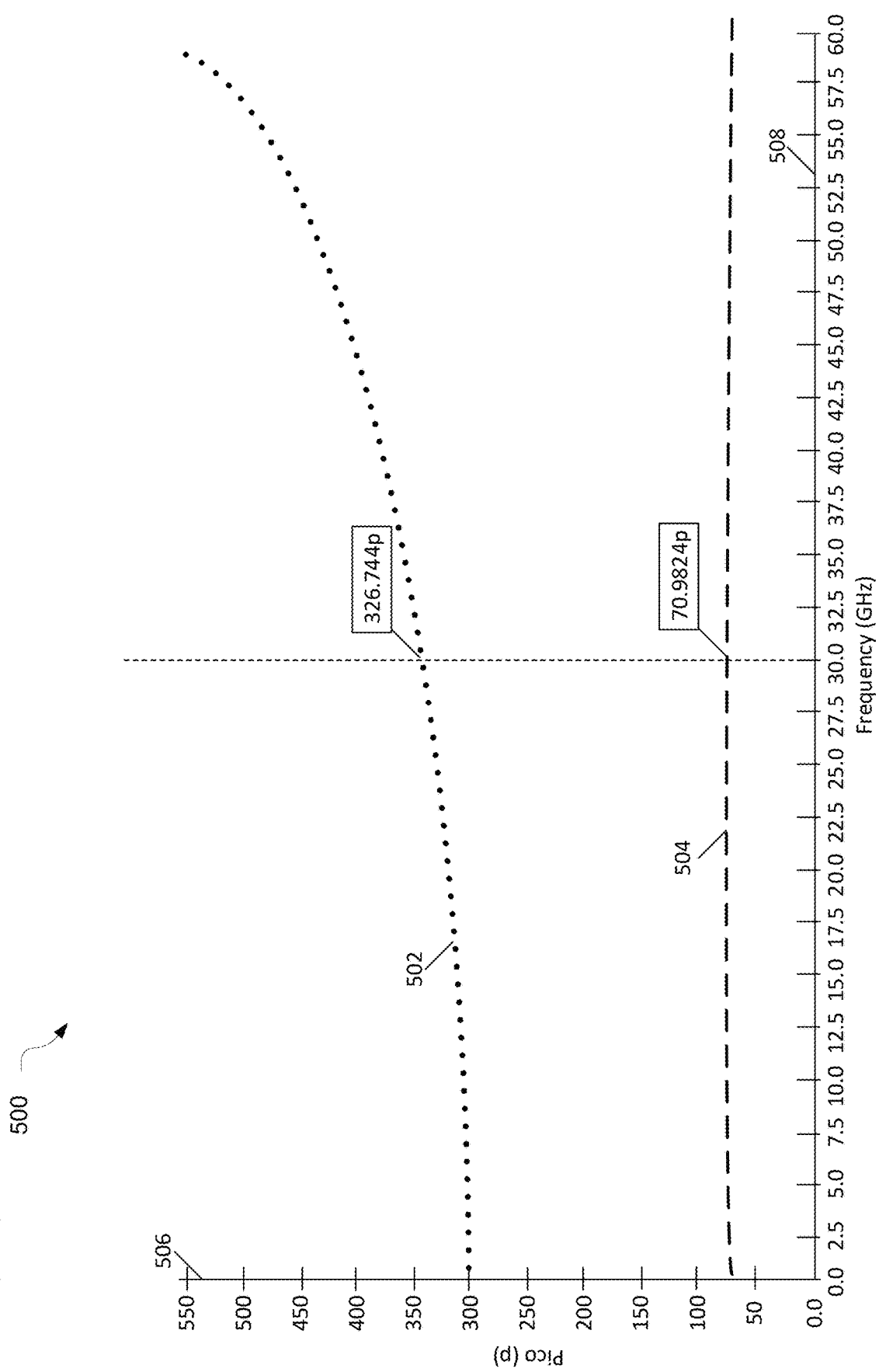
FIG. 5 illustrates a comparison of inductance (L) values between a single-port figure-8 inductor and a multi-port figure-8 inductor of the same size.

FIG. 5 illustrates a comparison of inductance values between a single-port figure-8 inductor structure, such as inductor structure 200, and a multi-port figure-8 inductor structure, such as inductor structure 300. FIG. 5 shows chart 500 which compares the inductance value for the single-port figure-8 inductor structure and the multi-port figure-8 inductor structure. Chart 500 includes the inductance value along Y-axis 506 and the frequency, in GHz, along X-axis 508. Line 502 represents the inductance value for the multi-port figure-8 inductor structure across different frequencies. Line 504 represents the inductance value for the single-port figure-8 inductor structure across different frequencies. As shown in chart 500, line 502 shows a lower inductance value over a wideband of frequencies as compared to line 504. For example, at 30 GHz, the multi-port figure-8 inductor structure achieves an inductance value of 70.9824 picohenrys (pH), while the single-port figure-8 inductor structure achieves an inductance value of 326.744 pH. As shown in FIG. 5, the multi-port figure-8 inductor structure maintains an almost constant inductance value across frequencies from 0 to 60 GHz.

Additionally, the multi-port figure-8 inductor structure achieves an improved radiation pattern as compared to a multi-port circular inductor structure. The magnetic flux of a multi-port circular inductor structure as compared to the magnetic flux of a multi-port figure-8 inductor structure spreads decays slowly as it spreads toward the boundary. In contrast, the multi-port figure-8 inductor structure causes the magnetic flux to decay very fast and concentrates most of the magnetic flux at the center point of the multi-port figure-8 inductor structure. The fast magnetic flux decay and concentration at the center of the structure, makes the multi-port figure-8 inductor structure more self-contained as compared to a multi-port circular inductor structure.

Figure 6:
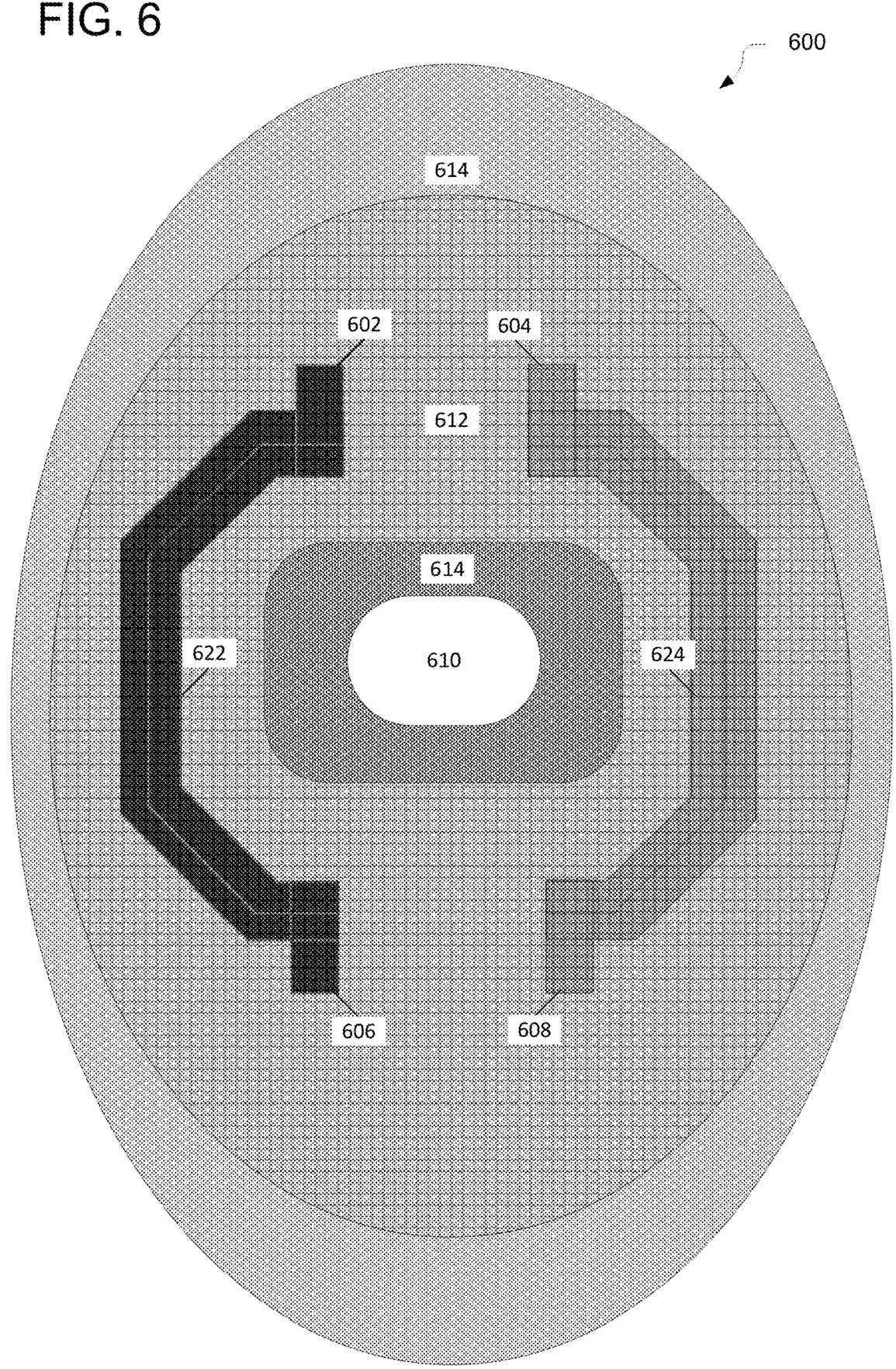
FIG. 6 illustrates a magnetic flux radiation pattern of a multi-port circular inductor.
Figure 7:
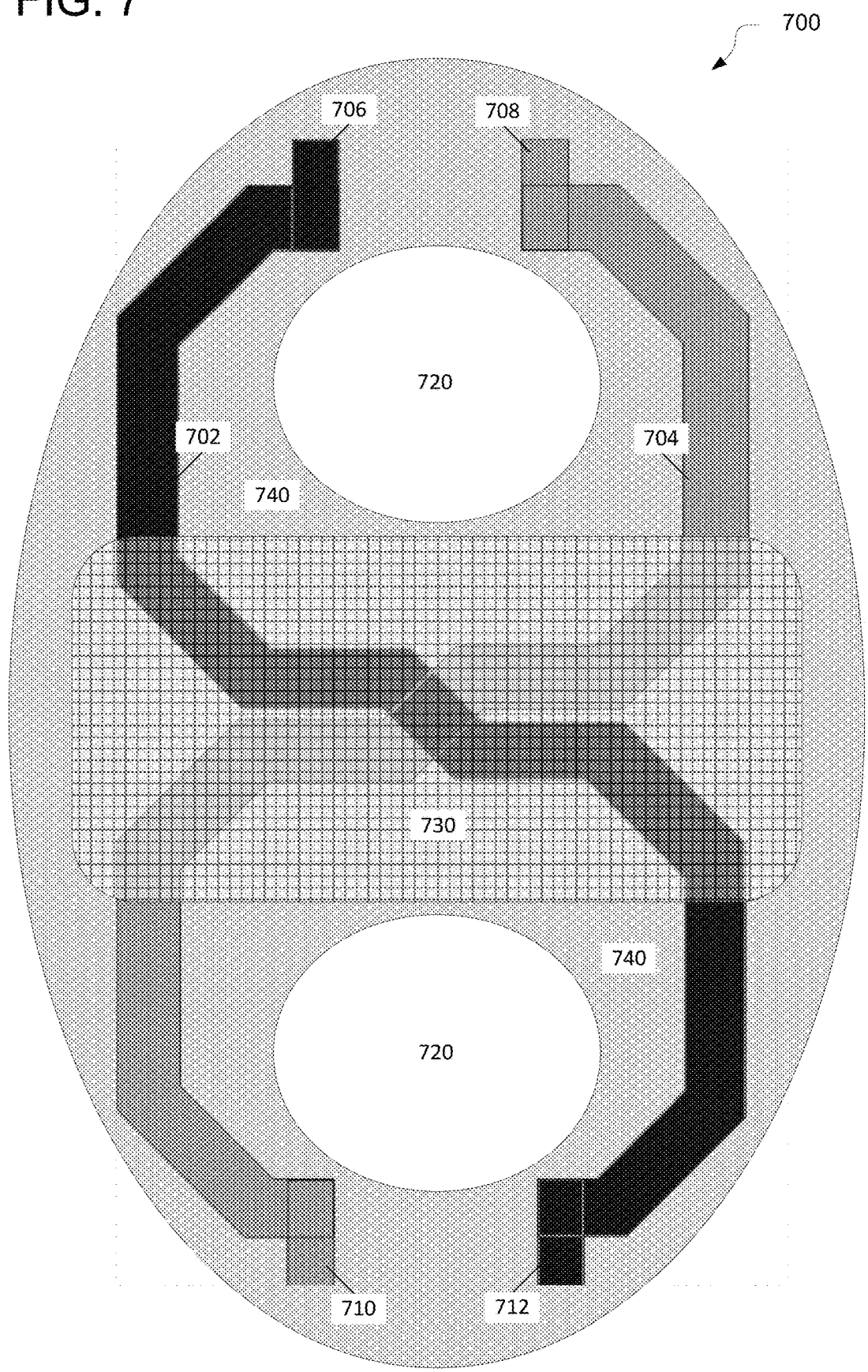
FIG. 7 illustrates a magnetic flux radiation pattern of a multi-port figure-8 inductor.

FIGS. 6 and 7 illustrate reduction in magnetic flux from the multi-port circular inductor structure as compared to the figure-8 inductor structure. FIG. 6 illustrates the radiation pattern for multi-port circular inductor structure 600. The multi-port circular inductor structure may include first winding 622 and second winding 624. First winding 622 may include first terminal 602 and second terminal 606. Second winding 624 may include third terminal 604 and fourth terminal 608. Terminals 602, 604, 606, and 608 may be configured to receive a signal. Regions 610, 612, and 614 show the intensity of the magnetic flux in the area of the inductor structure. Region 610 illustrates a region of little or no magnetic flux. Regions 614 illustrate regions of decaying magnetic flux. Region 612 illustrates a region of high magnetic flux. As shown in FIG. 6, the magnetic flux pattern 600, with region 612 of high magnetic flux, radiates from windings 622 and 624. Such magnetic flux pattern may approach inductor boundaries and introduce radiation violations or phase noise.

FIG. 7 illustrates radiation pattern for multi-port figure-8 inductor structure 700. The multi-port figure-8 inductor structure may be the same as inductor structure 300. The multi-port figure-8 inductor structure may include first winding 702 and second winding 704. First winding 702 may include first terminal 706 and second terminal 712. Second winding 704 may include third terminal 708 and fourth terminal 710. Terminals 706 and 710 may be configured to receive positive signals which are in the same phase relative to each other. Terminals 708 and 712 may be configured to receive negative signals which are in the same phase relative to each other and 180 degrees out of phase with the positive signals. Regions 720, 730, and 740 show the intensity of the magnetic flux in the area of the inductor structure. Regions 720 illustrate regions of little or no magnetic flux. Region 740 illustrates a region of decaying magnetic flux. Region 730 illustrates a region of high magnetic flux. As shown in FIG. 7, the magnetic flux pattern 700, with region 730 of high magnetic flux, is concentrated at the center of the inductor structure where first winding 702 and second winding 704 intersect. The decaying region 740 may not approach the inductor boundaries generating little or no radiation violations or phase noise.

Measured data shows that the magnetic flux pattern 700 of the multi-port figure-8 inductor structure lowers radiation violations by more than 7 dB. According to measurements, phase noise of the oscillator is also improved and correlation to simulation has improved by 4 dB, due to the high symmetry of this inductor structure.

Figure 9:
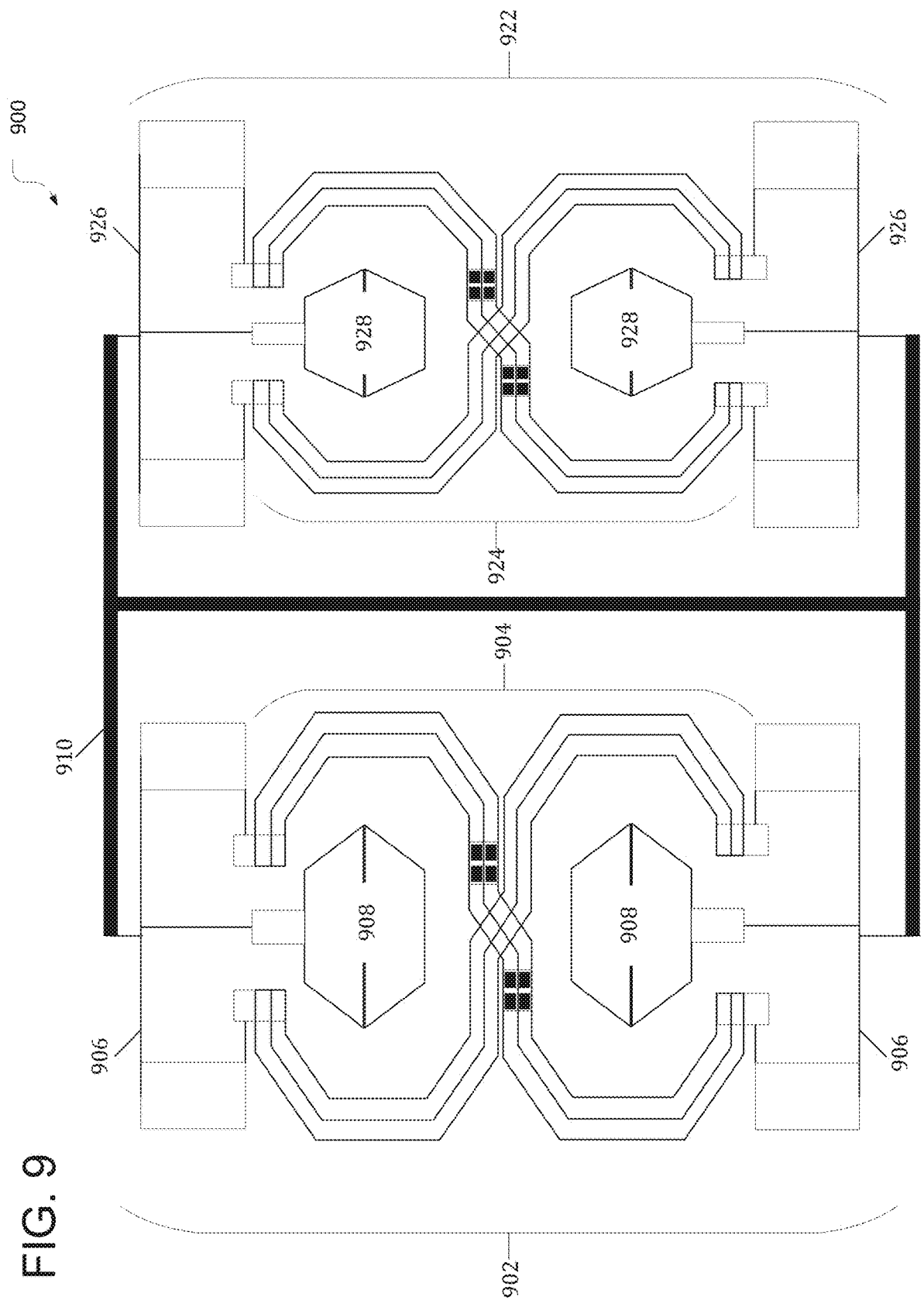
FIG. 9 illustrates a block configuration of two multi-port figure-8 inductors.

FIGS. 8 and 9 illustrate a top-view of boundary conditions for different silicon blocks including inductor structures. Both FIGS. 8 and 9 may represent the same circuitry area and boundary conditions and show the progression from using circular versus figure-8 inductor structures.

FIG. 8 illustrates circuitry 800 including two first block 802 and second block 822 separated by I-shaped boundary 810. First bock 802 may include multi-port circular inductor structure 804, similar to the inductor structure shown in FIG. 6. Multi-port circular inductor structure 804 may include LiT oscillator cores 806. Block 802 may inductively couple LiT oscillator cores 806 to terminals of inductor structure 804. Alternatively, block 802 may inductively couple other oscillator topologies or filters to terminals of inductor structure 804. Inductor structure 804 may include ground resonator 808, which may be connected to a common ground node. Ground resonator 808 may be surrounded by multi-port circular inductor structure 804. Ground resonator 808 may be connected to one or more Lchokes. The Lchokes may include RF chokes, which may be configured, for example, to provide a DC bias and/or to present an RF high impedance to drains of transistors of the LiT oscillator cores 806.

Similarly, second block 822 may include multi-port circular inductor structure 824, similar to the inductor structure shown in FIG. 6. Multi-port circular inductor structure 824 may include LiT oscillator cores 826. Block 922 may inductively couple LiT oscillator cores 826 to terminals of inductor structure 824. Alternatively, block 822 may inductively couple other oscillator topologies or filters to terminals of inductor structure 824. Inductor structure 824 may include ground resonator 828, which may be connected to a common ground node. Ground resonator 828 may be surrounded by multi-port circular inductor structure 824. Ground resonator 828 may be connected to one or more Lchokes. The Lchokes may include RF chokes, which may be configured, for example, to provide a DC bias and/or to present an RF high impedance to drains of transistors of the linearized transconductance oscillator cores 826.

Based on radiation pattern 600 described with respect to FIG. 6, the magnetic flux from block 802 and block 822 may approach I-shaped boundary 810. The magnetic flux from block 802 may cause interference in block 822. Similarly, the magnetic flux from block 822 may cause interference in block 802.

FIG. 9 illustrates circuitry 900 including two first block 902 and second block 922 separated by I-shaped boundary 910. First bock 902 may include multi-port figure-8 inductor structure 904, similar to the inductor structure shown in FIG. 7. Multi-port figure-8 inductor structure 904 may include LiT oscillator cores 906. Block 902 may inductively couple LiT oscillator cores 906 to terminals of inductor structure 904. Alternatively, Block 902 may inductively couple other oscillator topologies or filters to terminals of inductor structure 904. Inductor structure 904 may include ground resonators 908, which may be connected to a common ground node. Ground resonators 908 may be surrounded by multi-port figure-8 inductor structure 904. Ground resonators 908 may be connected to one or more Lchokes. The Lchokes may include RF chokes, which may be configured, for example, to provide a DC bias and/or to present an RF high impedance to drains of transistors of the LiT oscillator cores 906.

Similarly, second block 922 may include multi-port figure-8 inductor structure 924, similar to the inductor structure shown in FIG. 7. Multi-port figure-8 inductor structure 924 may include LiT oscillator cores 926. Block 922 may inductively couple LiT oscillator cores 926 to terminals of inductor structure 924. Alternatively, Block 922 may inductively couple other oscillator topologies or filters to terminals of inductor structure 924. Inductor structure 924 may include ground resonators 928, which may be connected to a common ground node. Ground resonators 928 may be surrounded by multi-port figure-8 inductor structure 924. Ground resonators 928 may be connected to one or more Lchokes. The Lchokes may include RF chokes, which may be configured, for example, to provide a DC bias and/or to present an RF high impedance to drains of transistors of the linearized transconductance oscillator cores 926.

Based on radiation pattern 700 described with respect to FIG. 7, the magnetic flux from block 902 and block 922 will be concentrated around the center of figure-8 inductor structures 904 and 924 respectively. The magnetic fluxes of blocks 902 and 922 may not approach I-shaped boundary 910. Therefore, the magnetic flux from block 902 should not cause interference in block 922. Similarly, the magnetic flux from block 922 should not cause interference in block 902.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

In the following examples disclose various aspects of this disclosure:

Example 1 is a circuitry including a first S-shaped winding and a second S-shaped winding intersected at a point of symmetry to form a figure-8 inductive structure including an upper loop and a lower loop, wherein the upper loop includes a first end of the first S-shaped winding and a first end of the second S-shaped winding, and wherein the lower loop includes a second end of the first S-shaped winding and a second end of the second S-shaped winding; a first terminal coupled to the first end of the first S-shaped winding and a second terminal coupled to the first end of the second S-shaped winding, wherein the first terminal is configured to receive a first positive signal and the second terminal is configured to receive a first negative signal; a third terminal coupled to the second end of the first S-shaped winding and a fourth terminal coupled to the second end of the second S-shaped winding, wherein the third terminal is configured to receive a second negative signal and the fourth terminal is configured to receive a second positive signal; wherein a magnetic flux is concentrated at the point of symmetry when a first current flows through the first S-shaped winding and a second current flows through the second S-shaped winding.

In Example 2, the subject matter of Example 1 may optionally further include, wherein the first positive signal is 180 degrees out of phase relative to the first negative signal.

In Example 3, the subject matter of Example 1 or 2 may optionally further include, wherein the second positive signal is 180 degrees out of phase relative to the second negative signal.

In Example 4, the subject matter of any of Examples 1 to 3 may optionally further include, wherein the first positive signal is in phase relative to the second positive signal.

In Example 5, the subject matter of any of Examples 1 to 4 may optionally further include, wherein the first negative signal is in phase relative to the second negative signal.

In Example 6, the subject matter of any of Examples 1 to 5 may optionally further include, wherein a first oscillator generates the first positive signal and the first negative signal.

In Example 7, the subject matter of any of Examples 1 to 6 may optionally further include, wherein a second oscillator generates the second positive signal and the second negative signal.

In Example 8, the subject matter of any of Examples 1 to 7 may optionally further include, wherein a first filter generates the first positive signal and the first negative signal.

In Example 9, the subject matter of any of Examples 1 to 8 may optionally further include, wherein a second filter generates the second positive signal and the second negative signal.

In Example 10, the subject matter of any of Examples 1 to 9 may optionally further include, a first resonator and a second resonator, wherein the first resonator fits in the upper loop and the second resonator fits in the lower loop.

In Example 11, the subject matter of any of Examples 1 to 10 may optionally further include, wherein the first resonator and the second resonator are couple to a ground reference signal.

In Example 12, the subject matter of any of Examples 1 to 11 may optionally further include, wherein an inductance value of the circuitry is less than an inductance value threshold.

In Example 13, the subject matter of any of Examples 1 to 12 may optionally further include, wherein a Quality factor value is greater than a Quality factor threshold.

In Example 14, the subject matter of any of Examples 1 to 13 may optionally further include, a boundary, wherein the magnetic flux is 0 at the boundary.

In Example 15, the subject matter of any of Examples 1 to 14 may optionally further include, wherein the first S-shaped winding crosses over the second S-shaped winding at the point of symmetry.

In Example 16, the subject matter of any of Examples 1 to 15 may optionally further include, wherein the second S-shaped winding crosses over the first S-shaped winding at the point of symmetry.

In Example 17, the subject matter of any of Examples 1 to 16 may optionally further include, wherein a first amplifier generates the first positive signal and the first negative signal.

In Example 18, the subject matter of any of Examples 1 to 17 may optionally further include, wherein a second amplifier generates the second positive signal and the second negative signal Example 19 is a method of designing a circuitry of any one of claims 1 to 18.

Example 20 is a non-transitory computer readable medium storing instructions that, when executed by one or more processors of a communication device, cause the communication device to perform the method of Example 19.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The terms "group," "set", "sequence," and the like refer to a quantity equal to or greater than one.

Any term expressed in plural form that does not expressly state "plurality" or "multiple" similarly refers to a quantity equal to or greater than one.

The term "lesser subset" refers to a subset of a set that contains less than all elements of the set.

Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

The words "exemplary" and "demonstrative" are used herein to mean "serving as an example, instance, demonstration, or illustration". Any aspect, embodiment, or design described herein as "exemplary" or "demonstrative" is not necessarily to be construed as preferred or advantageous over other aspects, embodiments, or designs.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of with regard to a group of elements may be used herein to mean at least one element from the group consisting of the elements. For example, the phrase "at least one of with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The terms "communicate" and "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UNITS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UNITS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LIE Extra, LTE-Advanced Pro, LTE Licensed-Assisted Access (LAA), MuLTEfire, UMTS Terrestrial Radio Access (UTRA), Evolved UNITS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Examples described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2

(59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where e.g. the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Examples described herein can also implement a hierarchical application of the scheme, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Some of the features in this document are defined for the network side, such as Access Points, eNodeBs, New Radio (NR) or next generation Node Bs (gNodeB or gNB—note that this term is typically used in the context of 3GPP fifth generation (5G) communication systems), etc. Still, a User Equipment (UE) may take this role as well and act as an Access Points, eNodeBs, gNodeBs, etc. i.e., some or all features defined for network equipment may be implemented by a UE.

Some examples may be used in conjunction with Radio Frequency (RF) systems, radar systems, vehicular radar systems, autonomous systems, robotic systems, detection systems, InfraRed (IR) systems, or the like. For example, with respect to systems, e.g., Light Detection Ranging (LiDAR) systems, and/or sonar systems, utilizing light and/or acoustic signals.

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuitry comprising:
    a first S-shaped winding and a second S-shaped winding intersected at a center point to form a figure-8 inductive structure including an upper loop and a lower loop, wherein the upper loop includes a first end of the first S-shaped winding and a first end of the second S-shaped winding, and wherein the lower loop includes a second end of the first S-shaped winding and a second end of the second S-shaped winding;
    a first terminal coupled to the first end of the first S-shaped winding and a second terminal coupled to the first end of the second S-shaped winding, wherein the first terminal is configured to receive a first positive signal and the second terminal is configured to receive a first negative signal;
    a third terminal coupled to the second end of the first S-shaped winding and a fourth terminal coupled to the second end of the second S-shaped winding, wherein the third terminal is configured to receive a second negative signal and the fourth terminal is configured to receive a second positive signal; and
    a boundary, wherein a magnetic flux is concentrated at the center point when a first current flows through the first S-shaped winding and a second current flows through the second S-shaped winding, wherein the magnetic flux is substantially absent at the boundary.

2. The circuitry of claim 1, wherein the first positive signal is 180 degrees out of phase relative to the first negative signal.

3. The circuitry of claim 2, wherein the second positive signal is 180 degrees out of phase relative to the second negative signal.

4. The circuitry of claim 3, wherein the first positive signal is in phase relative to the second positive signal.

5. The circuitry of claim 4, wherein the first negative signal is in phase relative to the second negative signal.

6. The circuitry of claim 5, wherein a first oscillator generates the first positive signal and the first negative signal.

7. The circuitry of claim 6, wherein a second oscillator generates the second positive signal and the second negative signal.

8. The circuitry of claim 5, wherein a first filter generates the first positive signal and the first negative signal.

9. The circuitry of claim 8, wherein a second filter generates the second positive signal and the second negative signal.

10. The circuitry of claim 5, further comprising a first resonator and a second resonator, wherein the first resonator fits in the upper loop and the second resonator fits in the lower loop.

11. The circuitry of claim 10, wherein the first resonator and the second resonator are couple to a ground reference signal.

12. The circuitry of claim 7, wherein an inductance value of the circuitry is less than an inductance value threshold.

13. The circuitry of claim 7, wherein a Quality factor value is greater than a Quality factor threshold.

14. The circuitry of claim 1, wherein the magnetic flux is 0 at the boundary.

15. The circuitry of claim 1, wherein the first S-shaped winding crosses over the second S-shaped winding at the center point.

16. The circuitry of claim 1, wherein the second S-shaped winding crosses over the first S-shaped winding at the center point.

17. The circuitry of claim 5, wherein a first amplifier generates the first positive signal and the first negative signal.

18. The circuitry of claim 17, wherein a second amplifier generates the second positive signal and the second negative signal.

19. A circuitry comprising:
a first S-shaped winding and a second S-shaped winding intersected at a center point to form a figure-8 inductive structure including an upper loop and a lower loop, wherein the upper loop includes a first end of the first S-shaped winding and a first end of the second S-shaped winding, and wherein the lower loop includes a second end of the first S-shaped winding and a second end of the second S-shaped winding;
a first terminal coupled to the first end of the first S-shaped winding and a second terminal coupled to the first end of the second S-shaped winding, wherein the first terminal is configured to receive a first positive signal and the second terminal is configured to receive a first negative signal;
a third terminal coupled to the second end of the first S-shaped winding and a fourth terminal coupled to the second end of the second S-shaped winding, wherein the third terminal is configured to receive a second negative signal and the fourth terminal is configured to receive a second positive signal; and
a boundary, wherein a magnetic flux is concentrated at the center point when a first current flows through the first S-shaped winding and a second current flows through the second S-shaped winding, wherein the magnetic flux is 0 at the boundary.

* * * * *